United States Patent [19]

Gralak

[11] Patent Number: 5,008,920
[45] Date of Patent: Apr. 16, 1991

[54] X-RAY FILM CASSETTE WITH FLEXIBLE GRID BONDED TO PRESTRESSED COVER

[75] Inventor: Ronald P. Gralak, Cincinnati, Ohio

[73] Assignee: Liebel-Flarsheim Company, Cincinnati, Ohio

[21] Appl. No.: 441,180

[22] Filed: Nov. 27, 1989

[51] Int. Cl.$^5$ .................... G03B 42/04; G21K 1/00
[52] U.S. Cl. .................... 378/185; 378/154; 378/182; 378/186
[58] Field of Search ............ 378/187, 186, 185, 188, 378/182, 154, 166, 167

[56] References Cited

U.S. PATENT DOCUMENTS

| 2,193,021 | 3/1940 | Dietz | 378/185 |
| 3,504,180 | 3/1970 | Tone | 378/187 |
| 3,511,990 | 5/1970 | Hauss | 378/187 |
| 3,919,559 | 11/1975 | Stevens | 250/508 |
| 4,032,790 | 6/1977 | Nakamura | 250/480 |
| 4,081,686 | 3/1978 | Nieuweboer | 378/187 |
| 4,380,087 | 4/1983 | Tanaka | 378/186 |
| 4,538,294 | 8/1985 | Tamura et al. | 378/187 |
| 4,706,269 | 11/1987 | Reina et al. | 378/154 |

FOREIGN PATENT DOCUMENTS 2035300  2/1987  Japan.

Primary Examiner—Edward P. Westin
Assistant Examiner—Kim-Kwok Chu
Attorney, Agent, or Firm—Wood, Herron & Evans

[57] ABSTRACT

An x-ray film cassette is disclosed having a pair of covers at least one of which is resilient and prestressed to arch inwardly when the cassette is opened and to flatten from contact with the interior contents of the cassette when the cassette is pressed closed. A flexible x-ray grid is bonded to the interior of the cover to arch and flatten congruently with the cover. The grid is flexible enough to arch and flatten congruently with the resilient cover which protects the structural integrity of the grid by limiting flexing of the grid to predetermined limits defined by the degree of prestress of the cover.

22 Claims, 2 Drawing Sheets

X-RAY FILM CASSETTE WITH FLEXIBLE GRID BONDED TO PRESTRESSED COVER

FIELD OF THE INVENTION

The present invention relates to x-ray film cassettes of the type having at least one resilient cover prestressed to arch inwardly when the cassette is opened and to flatten as the cassette is pressed closed in order to expel any air pockets adjacent the film. More particularly, the present invention relates to providing such an x-ray cassette with a flexible grid, a major surface of which is bonded to the inside of the cover so as to permit the grid to arch and flatten congruently with the cover.

BACKGROUND OF THE INVENTION

X-ray film cassettes are used in a variety of medical and industrial applications to house an x-ray film sheet. The use of a cassette facilitates handling of the film to protect the film from exposure to light before and after exposure to x-rays. The cassette also holds the x-ray sheet flatly in place during the x-ray exposure.

X-ray cassettes are typically constructed of a front cover and an opposing back cover. Both covers are usually constructed of an x-ray transparent material such as aluminum and are pivotably connected to one another by a hinge. One cover is typically surrounded at least partially by a recessed channel which receives a rib extending from the other cover. When the front and back covers are pivoted on the hinge toward one another to close the cassettes the rib mates with the channel in the opposing cover. This forms a barrier which prevents outside light from entering the cassette. Examples of such cassettes are those disclosed in U.S. Pat. Nos. 3,001,071 and 3,157,787.

One problem associated with the cassettes described above is the possible retention of air pockets adjacent the film inside the cassette when the cassette is closed. These air pockets affect the transmission of x-rays through the cassette and produce artifacts which degrade the quality of the x-ray image and impair its readability.

To overcome this problem of air pockets, it is known to provide an x-ray film cassette with at least one resilient cover with a bowed shape which arches inwardly when the cassette is open and which flattens due to engagement with the interior of the cassette as the cassette is pressed closed. A latching mechanism holds the cassette closed maintaining the flattened shape of the cover. Upon releasing the latch, the cassette springs open slightly due to the cover reassuming its arched shape. The interior of the cassette generally includes a pair of image intensifying screens between which a sheet of unexposed film is initially loaded. As the covers are closed, the cover flattens to press the film firmly between the screens. Due to the arched shape of the cover, pressure is initially asserted only near the center line of the film. As the cassette closes further, the region of pressure spreads toward opposite sides of the film as the cover continues to flatten until the cassette is completely closed. The increasing pressure spreading outwardly in this manner expels any air pockets which might otherwise have become trapped against the surface of the film. An example of such a cassette is disclosed in U.S. Pat. No. 4,032,790.

Another problem in producing clear x-ray pictures is the presence of scattered x-rays. Scattered x-rays are produced when x-rays strike an object within the x-ray subject so as to cause them to reflect at an oblique angle to the object. Scattered x-rays usually occur at the boundaries of a structure within an x-rayed object and blur the image of edges of the structure. To mitigate the effects of scattered x-rays, it is well known to interpose an anti-scatter grid between the x-rayed object and the film.

Anti-scatter grids are usually constructed of lead strips separated by spacers of aluminum, plastic, bakelite or other x-ray transmissive material. The lead strips and aluminum strips are dimensioned and arranged so that scattered x-rays are absorbed by the lead strips while other x-rays are permitted to pass through the spacers to the film. Eliminating scattered x-rays in this manner produces a clearer x-ray image. U.S. Pat. No. 4,380,087 notes that it has been known to encase such a grid in a rigid sheath of aluminum or other material and to lay the grid exteriorly of the x-ray incident side of the cassette. The aforementioned patent also discloses forming a grid integrally with a flat cover of the cassette. Such an arrangement is advantageous in a number of respects. The grid is captured by the cover and does not require handling as a separate element. The cover also helps to protect the grid from mechanical damage. However, such a flat cover is incapable of operating to expel air pockets in the manner described above since it is not prestressed to arch when open and resiliently flatten upon closing the cassette.

In view of the foregoing, it is an object of this invention is to provide an x-ray film cassette which combines the advantages of a cassette having a captive grid for absorbing scattered x-rays with those of a cassette having a cover adapted to expel any air pockets adjacent the surface of a sheet of film housed by the cassette. It is a further object of the invention to provide a method of making such an x-ray cassette.

SUMMARY OF THE INVENTION

An x-ray film cassette is provided which includes at least one resilient cover prestressed to arch inwardly when the cassette is opened and to flatten due to contact with the interior contents of the cassette when the cassette is pressed closed. In accordance with the present invention, a flexible grid is bonded to the interior of the cover to arch and flatten congruently with the cover. As the cover is closed, pressure from the cover is transmitted through the grid to an intensifier screen or other layer adjacent the film sheet housed by the cassette. The flexibility of the grid permits the area of pressure on the screen to widen outwardly from near the center of the film toward opposite sides of film as the cover flattens upon closing of the cassette to facilitate the expulsion of air pockets adjacent the film. The cover captures the grid to prevent it from becoming lost and to eliminate any need for a user of the cassette to handle the grid as a separate element. The cover also partially shields the grid to protect the grid from impact damage. Moreover, because the cover flexes only between predetermined limits which do not exceed the limits between which the grid can be flexed without sustaining damage, the structural integrity of the grid is maintained.

These and other aspects of the invention will become even more clear upon review of the following description of a preferred embodiment of the invention together with the drawings in which like reference numerals designate like items.

DESCRIPTION OF THE PREFERRED EMBODIMENT

Figure 1:
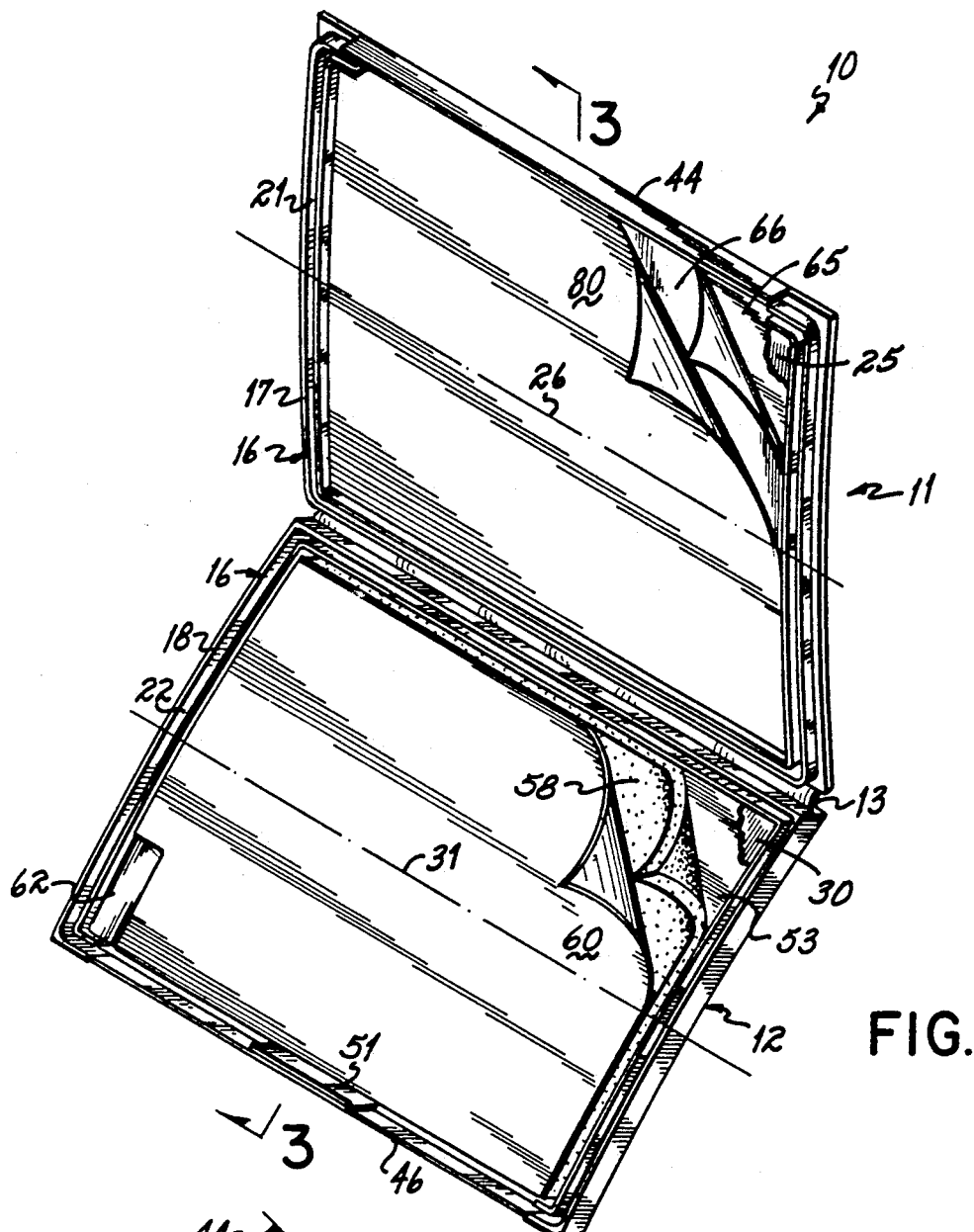
FIG. 1 is a perspective view of a preferred embodiment of a cassette constructed according to the invention, the cassette being shown in an open position.

As shown in FIG. 1, a preferred embodiment of an x-ray film cassette 10 constructed in accordance with the present invention includes a rectangular front cover 11 pivotably connected to a mating rear cover 12 by a live hinge 13. A frame 16, which is preferably formed integrally with hinge 13, includes a first section 17 which surrounds front cover 11 on three sides and a second section 18 which surrounds rear cover 12 on three corresponding sides. Hinge 13 and frame 16 are preferably molded of polyurethane or other suitable material as a single member. Sections 17 and 18 include respective inwardly projecting channels 21 and 22, the walls of which mate upon closure of cassette 10 to provide a light-occlusive barrier along three sides thereof.

Figure 2:
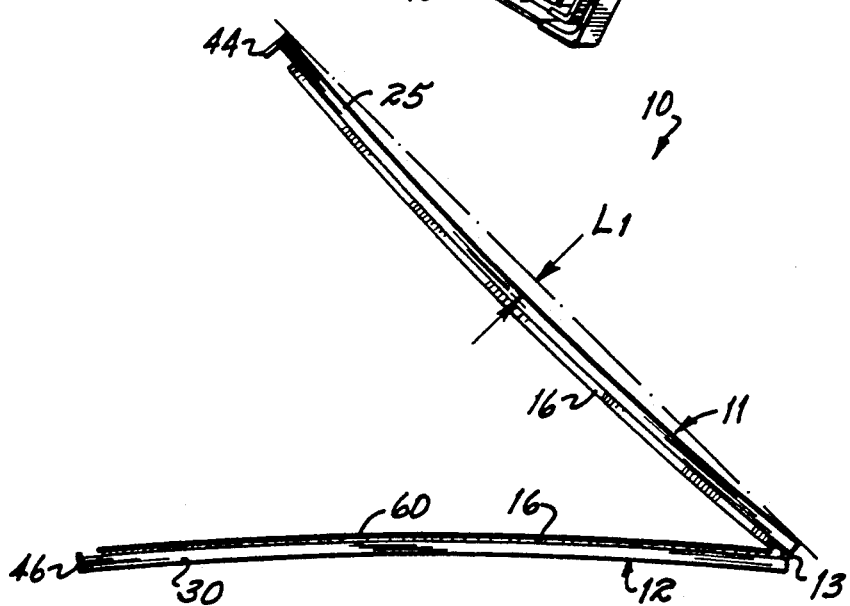
FIG. 2 is an end view of the cassette of FIG. 1.

Front cover 11 includes a resilient front panel 25 of aluminum or other x-ray transmissive material. Panel 25 is received within slots formed in section 17 in order to secure panel 25 to frame 16. Front panel 25 is prestressed to arch symmetrically about an axis 26 as to naturally bow toward the interior of cassette 10 when the cassette is open. A rear panel 30 of like material is similarly mounted in section 18 of frame 16. In the preferred embodiment illustrated, rear panel 30 is optionally prestressed to arch resiliently about a second axis 31 which aligns with axis 26 when cassette 10 is closed. However, for carrying out the invention, it is only essential that front panel 25 arch resiliently inwardly. Rear panel 31 may suitably comprise a flat rigid panel if desired. As FIG. 2 illustrates, frame 16 is sufficiently compliant that front panel 25 causes the entirety of front cover 11 to arch inwardly to a first predetermined limit of deflection, L1, when cassette 10 is open. Rear panel 30, also being prestressed in the preferred embodiment, causes rear cover 12 to arch in a similar manner as shown.

Figure 3:
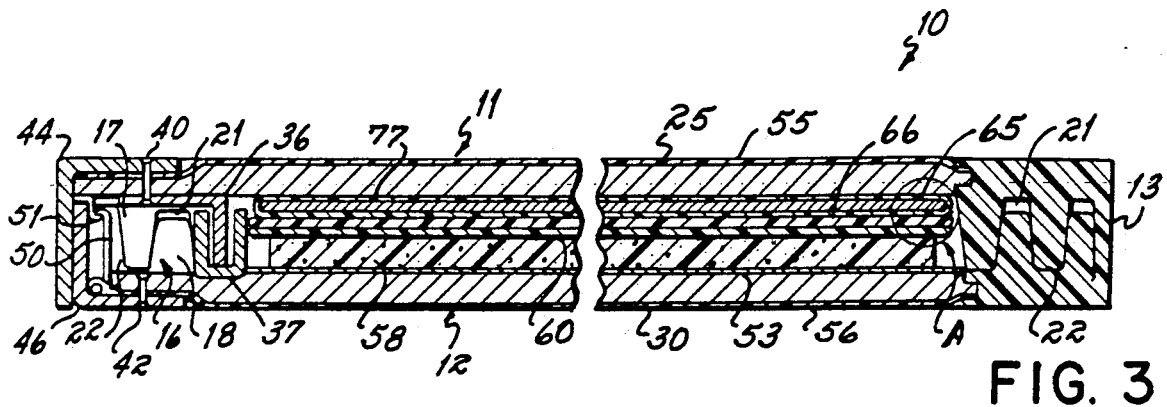
FIG. 3 is a cross-sectional view along line 3—3 of FIG. 1 taken when the cassette of FIG. 1 is in a closed position.

With additional reference now to FIG. 3, it can be seen that the interior side of the distal edge of panel 25 carries a strip 36 of L-shaped cross-section while panel 30 carries a strip 37 of U-shaped cross-section. Strips 36 and 37, which may be conveniently extruded of black-colored plastic material, mate as shown when cassette 10 is closed to form a continuation of the light-occlusive barrier provided by channels 21 and 22 along the other three sides of cassette 10. The edges of strips 36 and 37 are preferably sealed with a black resin in the areas adjoining panels 25 and 30, respectively, as well as the areas abutting respective the channels 21 and 22 to insure a light occlusive construction. While strip 37 is adhesively bonded to panel 30, strip 36 is attached to panel 25 by means of a plurality of rivets 40. Rivets 40 also serve to join an L-shaped edgepiece 44 to panel 25 while a similar series of rivets 42 secures an overlapping edgepiece 46 to the outside distal edge of panel 30. Edgepiece 46 carries a spring-loaded releasable latch member 50 positioned for selective engagement with a catch 51 welded to opposing edgepiece 44.

To prevent x-rays from reflecting back toward the film housed within cassette 10, a layer of lead foil 53 is glued to the interior surface of rear panel 30. The exterior surfaces of panels 25 and 30 each preferably include thin layers 55 and 56 of embossed vinyl or other x-ray transmissive decorative coating. A resilient foam cushion 58 is glued onto lead foil 53 and a first x-ray image intensifying screen 60, such as the type available from the Kodak Corporation under the trademark LANEX, is adhered atop foam cushion 58. Both screen 60 and cushion 58 are preferably inletted to expose a window 62 into which a tag (not shown) having indicia imprinted thereon may be inserted in order to reproduce those indicia on the film housed within cassette 10.

A cassette as described so far, and not including an anti-scatter grid, is commercially available from the Kodak Corporation under the trademark X-OMATIC, Model C-1. In order to make a cassette in accordance with the present invention and as depicted in the FIGS. from such a commercially available cassette, a flexible anti-scatter grid 65 is bonded to the interior surface of front panel 25. A second image intensifying screen 66 is preferably, but optionally, then bonded to the interior surface of the flexible grid 65. While other suitable bonding means may be used, flexible grid 65 is preferably adhered to panel 25 with an adhesive such as a sprayable type available from the 3M Corporation of Minneapolis, Minn. as SCOTCH-GRIP type 77. A double-sided adhesive tape may conveniently be used to bond intensifier screen 66 to flexible grid 65.

Figure 4:
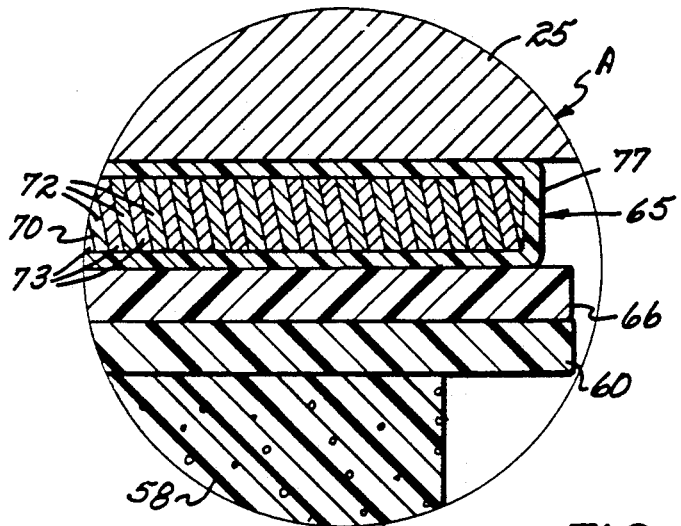
FIG. 4 is an enlarged view of area A of FIG. 3 when the cassette is closed.

Flexible grid 65 is constructed to bend between at least predetermined deflection limits without sustaining permanent mechanical damage. Those limits are defined by the limits between which front cover 11 deflects as it bends about axis 26 between the arched configuration (illustrated in FIG. 2) when cassette 10 is open and the flattened configuration (illustrated in FIG. 3) when cassette 10 is closed. With additional reference to FIG. 4, the interior core 70 is formed by interdigitating extremely thin layers 72 of x-ray absorbing lead with extremely thin layers 73 of x-ray transmissive material such as aluminum. Layers 72 and 73 are arranged to run substantially parallel with axis 26 and extend the entire length of grid 65. The flexible grid 65 of the preferred embodiment has overall dimensions of 348 mm in width and 424 mm in length and has a density of 152 lines per inch and is formed in a 6:1 or 8:1 ratio. However, it should be noted that the dimensions of grid 65, its line density and ratio may be varied to suit the needs of a particular application and that the invention is not limited to any specific line density or dimensions.

In order to maintain the structural integrity of grid 65 as it flexes, grid 65 is encapsulated in a thin layer 77 of polymeric material. While the encapsulating layer 77 may suitably be formed of a material such as that available under the trademark KAPTON, layer 77 is preferably formed of a carbon-fiber reinforced polymeric material offering excellent x-ray transmissivity, and combining high tensile strength with high flexibility. This carbon fiber material is applied to core 70 to form a substantially uniform layer about 0.34 mm thick. While the precise thickness of layer 77 may vary somewhat in accordance with the overall dimensions of grid 65 and the material selected to form layer 77, it is preferable to keep layer 77 as thin as possible in order to provide very low x-ray absorption while at the same time ensuring that layer 77 is strong enough to withstand the degree of flexing which grid 65 will undergo in use. Grid 65 may suitably be constructed as an unfocused grid in which all aluminum and lead layers 72, 73 run parallel to one another with the face of each layer 72, 73 oriented to lie normal to a horizontal plane representing the surface of the film housed by cassette 10 when closed. However, grid 65 is preferably a focused grid.

To construct a focused grid 65, the layers 72, 73 in the area of the longitudinal centerline of the grid are oriented normal to the horizontal plane as in an unfocused grid. However, as subsequent layers 72, 73 are added to the grid from the central area extending outwardly in two directions toward the longitudinal edges of the grid, the layers are canted to direct x-rays to converge toward the film. The degree of canting of layers 72, 73 progressively increases as their distance from the longitudinal centerline of grid 65 increases and may be varied in accordance with the desired focal length of the grid.

Focused grids encapsulated in a thin layer of carbon fiber reinforced material and suitable for use as flexible grid 65 are available from Mitaya Shoji Co. Ltd. of Tokyo, Japan as Model No. 276130 (39 inch focal length) and Model No. 276132 (59 inch focal length).

In operation, cassette 10 is initially in an open position in which, as illustrated in FIG. 2, front cover 12 arches inwardly due to the prestressing of panel 30 to define a first limit of deflection having a radius of curvature of about 133" (inches). Being bonded to front cover 12, flexible grid 65 likewise arches inwardly congruently with front cover 12 as does the intensifier screen 66 adhered to the grid. Although optional to the practice of the invention, rear cover 12 also arches inwardly in the preferred embodiment to a radius of about 90" (inches). The foam cushion 58 adhered to the rear cover 12 and the intensifier screen 60 adhered to the cushion also bend with rear cover 12.

Figure 5:
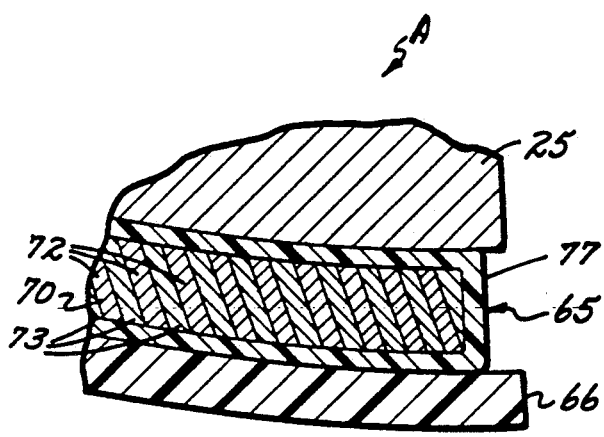
FIG. 5 is a view within area A when the cassette is open.

The curvature of front cover 11 when cassette 10 is open causes grid 65 to distort in the manner illustrated in FIG. 5 which would result in significant blockage of non-scattered x-rays passing in the normal direction. However, due to its flexible construction such distortion is not permanent. While further bending in the direction of curvature might otherwise permanently damage grid 65 and render it inoperative, the invention prevents this from occurring. The bending of grid 65 is positively limited by the limits between which panel 25 can bend resiliently as a result of its prestressing. Those limits are selected to lie within the limits between which grid 65 is capable of flexing without damage. Accordingly, cover 11 protects grid 65 from damage due to bending by limiting the degree to which grid 65 can be bent without excessive force. Being of a substantial thickness of aluminum, cover 11 also helps protect grid 65 from impact damage.

A sheet of film 80 to be exposed is centered on intensifying screen 60. Front cover 11 is then pivoted on hinge 13 toward rear cover 12 until latch 50 engages catch 51 to secure cassette 10 in a closed position. As covers 11 and 12 are forced together to capture film 80 in place between image intensifier screens 60 and 66, pressure is initially brought to bear near the longitudinal center of film 80 near axes 26 and 31. As covers 11 and 12 are drawn further closed after both screens 60 and 66 initially contact the film 80, grid 65 progressively flattens together with front cover 11. Cover 12 also flattens.

With the progressive flattening of covers 11 and 12, the area of clamping pressure on screens 60 and 66 widens and spreads outwardly in two directions from near the longitudinal centerline of the screens toward their opposite edges until, by the time latch 50 engages catch 51, substantially the entire surface area of the film is clamped firmly between the screens. Rather than more or less evenly distributing the pressure exerted by front over 11 cover almost its entire area as would a rigid panel, the flexibility of grid permits that pressure to spread directionally as described. This facilitates complete purging of any air pockets which might otherwise become trapped between either of the screens 60, 66 and the film 80.

Cassette 10 is then positioned opposite an x-ray source behind the person or object to be x-rayed and the film 80 exposed as desired. To remove the exposed film for processing, latch 50 is released. Covers 11 and 12 reassume the arched configuration illustrated in FIG. 2 and grid 65 is restored to the arched condition of FIG. 5 due to the resiliency of cover 11. After each x-ray exposure, the x-ray film is removed from cassette 10. An unexposed film is then inserted between the intensifying screens 60 and 66 and the cassette is reclosed.

While the apparatus and method described above constitute preferred embodiments of the invention, it is to be understood that the invention is not limited to them. In light of the present disclosure, various alternative embodiments and equivalents will be apparent to persons skilled in the art. For example, the rear cover 12 may suitably be fabricated rigid and flat rather than resiliently bowed. Materials, shapes and dimensions can also be altered without departing from the legal scope of the invention as particularly pointed out and distinctly claimed in the appended claims.

What is claimed is:

1. A cassette for housing a sheet of x-ray film, said cassette comprising:

a front cover and a rear cover selectively matable with said front cover to close the cassette and separable therefrom to open the cassette, each of said covers including an exterior surface and an interior surface, the interior surfaces being mutually opposed one another when said cassette is closed, at least said front cover being prestressed to arch resiliently inwardly about a predetermined axis to a first limit of deflection when the cassette is open and to progressively resiliently flatten to a second limit of deflection when the cassette is fully closed;

an anti-scatter grid bonded to said interior surface of said front cover to arch and flatten congruently therewith, said first and second limits of deflection of said cover lying in a range within which said grid can deflect without sustaining damage, the progressive flattening of said grid facilitating the purging of air pockets away from the surface of the film as the cassette is closed.

2. The x-ray film cassette of claim 1 wherein: said grid is encapsulated in a carbon fiber reinforced layer.

3. The x-ray film cassette of claim 1 further comprising: a first image intensifying screen disposed adjacent said interior surface of said rear cover.

4. The x-ray film cassette of claim 3 further comprising: a resilient cushion disposed between said first image intensifying screen and said interior surface of said rear cover.

5. The x-ray film cassette of claim 1 further comprising: a second image intensifying screen positioned in contact with said grid.

6. The x-ray film cassette of claim 5 wherein: said second image intensifying screen is bonded to said grid.

7. The x-ray film cassette of claim 1 further comprising: a first image intensifying screen disposed adjacent said interior surface of said rear cover and a second image intensifying screen positioned between said grid and said first image intensifying screen whereby an x-ray film may be housed interiorly of said cassette between said first image intensifying screen and said second image intensifying screen.

8. The x-ray film cassette of claim 1 wherein: said rear cover is prestressed to arch resiliently inwardly when the cassette is open and flattens upon closing the cassette.

9. An x-ray film cassette comprising:
an rear cover;
a resilient front cover having an interior surface, said front cover having an inwardly arched shape and connected to said rear cover by a hinge, said hinge permitting said rear cover and said covers to mate with one another to define a closed position in which said front cover assumes a flattened shape and to separate from one another to define an open position in which said front cover assumes said inwardly arched shape; and
a flexible grid for absorbing scattered x-rays, said grid being bonded to the interior surface of said front cover, said grid assuming said inwardly arched shape of said front cover when said front cover and rear cover are in said open position and flattening congruently with said front cover when said front cover and rear cover are mated to close the cassette.

10. The x-ray film cassette of claim 9 wherein: said grid comprises an array of alternating x-ray absorbing and x-ray transmissive layers, said array being encapsulated in a flexible layer of polymeric material.

11. The x-ray film cassette of claim 10 wherein: said flexible layer comprises a carbon fiber reinforced layer.

12. An x-ray film cassette comprising:
a rear cover having an interior surface and an exterior surface;
a resilient front cover having an interior surface and an exterior surface, said front cover having an inwardly arched shape and connected to said rear cover by a hinge, said hinge permitting said rear cover and said front cover to pivotally mate with one another to define a closed position in which said front cover flattens and separates from one another to define an open position in which said front cover assumes said inwardly arched shape;
a flexible grid for absorbing scattered x-rays, said grid having a core encapsulated in a flexible layer, said grid being attached to said interior surface of said front cover and arching inwardly congruent with said arched shape of said front cover when said front cover and back cover are in said open position and flattening congruently with said front cover when said front cover and rear cover are in said closed position; and
at least one image intensifying screen positioned between said front cover and said rear cover.

13. The x-ray film cassette of claim 12 wherein: said at least one image intensifying screen comprises a first image intensifying screen attached to said interior surface of said rear cover by way of a resilient cushion interposed between said first image intensifying screen and said interior surface of said rear cover.

14. The x-ray film cassette of claim 13 wherein: said at least one image intensifying screen comprises a second image intensifying screen disposed between said grid and said first image intensifying screen.

15. A method of making an x-ray film cassette, said method comprising the steps of:
forming a front panel having an interior surface and an exterior surface, said panel being prestressed to resiliently arch and flatten about a predetermined axis;
forming a rear panel having an interior surface and an exterior surface;
bonding an anti-scatter grid to said interior surface of said panel, said grid being encapsulated in a layer of flexible polymeric material to bend without damage between limits of deflection at least as great as those between which said cover arches and flattens; and
connecting said front panel to said rear panel by connecting means for connecting said covers while allowing selective movement of said covers between an open position in which said interior surfaces are mutually separated and in which said front panel and said grid both arch inwardly about said axis and a closed position in which said interior surfaces oppose and indirectly forcibly contact one another through at least said flexible grid, said forcible contact causing said front panel and said grid to flatten progressively as said cover is closed to facilitate the purging of air pockets away from the surface of a sheet of film housed within the cassette.

16. The method of claim 15 further comprising: the step of positioning at least one image intensifying screen between said grid and said rear panel.

17. The method of claim 16 further comprising: the step of attaching a resilient cushion to said rear panel between said rear panel and said screen.

18. A method for making an x-ray film cassette, said method comprising the steps of:
connecting a rear cover to a hinge;
forming a resilient front cover having an inwardly arched shape;
connecting said front cover to said hinge, said hinge permitting said rear cover and said front cover to selectively move toward each other into a closed position in which said front cover assumes a flattened shape and away from one another into an open position in which said front cover assumes said inwardly arched shape; and
attaching a grid for absorbing scattered x-rays to said front cover, said grid arching and flattening congruently with said front cover to assume an inwardly arched shaped when said front cover and said rear cover are in said open position and assuming a flattened shape when said front cover and said rear cover are in the closed position.

19. The method of claim 18 further comprising: the step of encapsulating said grid for absorbing scattered x-rays in flexible material before attaching said grid to said front cover.

20. The method of claim 18 wherein: said grid is attached to an interior surface of said front cover.

21. The method of claim 18 further comprising: the step of positioning at least one image intensifying screen between said grid and said rear panel.

22. The method of claim 19 wherein: said grid is encapsulated in a carbon fiber reinforced material.

* * * * *